United States Patent
Fujiwara et al.

(10) Patent No.: US 7,015,653 B2
(45) Date of Patent: Mar. 21, 2006

(54) LIGHT MODULATING APPARATUS FOR EXCIMER DISCHARGE LAMP

(75) Inventors: Kunihiko Fujiwara, Hyogo (JP); Masaki Nakamura, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 5 days.

(21) Appl. No.: 10/912,109

(22) Filed: Aug. 6, 2004

(65) Prior Publication Data

US 2005/0057190 A1   Mar. 17, 2005

(30) Foreign Application Priority Data

Aug. 29, 2003  (JP)  ............................. 2003-307626

(51) Int. Cl.
*H05B 37/00*  (2006.01)

(52) U.S. Cl. ...................... 315/224; 315/247; 315/307

(58) Field of Classification Search ..................... None
See application file for complete search history.

(56) References Cited

U.S. PATENT DOCUMENTS

| 5,936,358 A | 8/1999 | Okamoto et al. |
| 6,541,924 B1 * | 4/2003 | Kane et al. .................. 315/246 |
| 6,646,391 B1 * | 11/2003 | Okamoto et al. ........... 315/246 |

FOREIGN PATENT DOCUMENTS

JP   2002-216993 A   8/2002

* cited by examiner

*Primary Examiner*—David Vu
(74) *Attorney, Agent, or Firm*—Rader, Fishman & Grauer PLLC (57) ABSTRACT

In a light modulating apparatus for an excimer discharge lamp high frequency voltage whose frequency is 1000 Hz band or higher is applied to the excimer discharge lamp and light is modulated by changing the frequency of the high frequency voltage, on-time per ½ cycle of the frequency is set so that the on-time is approximately equal to charging time for acquiring electric charges which contribute to light emission of the excimer discharge lamp, whereby stable light modulation is possible. Further, the high frequency voltage is modulated by rectangular waveform voltage having low frequency which is lower than that of the high frequency voltage whereby light can be stably modulated in a wide range.

7 Claims, 8 Drawing Sheets

LIGHT MODULATING APPARATUS FOR EXCIMER DISCHARGE LAMP

TECHNICAL FIELD OF THE INVENTION

The present invention relates to a light modulating apparatus for an excimer discharge lamp.

DESCRIPTION OF RELATED ART

Conventionally, a light modulating apparatus for an excimer discharge lamp in which light is modulated by changing lighting voltage or lighting frequency or by burst dimming, is known.

A light modulating apparatus in which lighting frequency of rectangle wave voltage impressed to an excimer discharge lamp is changed so as to modulate light is disclosed in Japanese Laid Open Patent No. 2002-216993.

In general, when high frequency high voltage impressed to an excimer discharge lamp is in a rectangular wave form, the intensity of light emitted from the lamp can be strengthened much more. Therefore, when the excimer discharge lamp is turned on by using the rectangle wave voltage, the amount of electric charges per ½ cycle is dependent on the capacity between electrodes of the excimer discharge lamp and voltage impressed to the lamp.

For example, in an excimer discharge lamp in which a discharge container thereof has a double tube structure comprising an outer tube and an inner tube, when the tube wall thickness of each tube and the gap length are 2 mm and 5 mm respectively, input power being 8 W/cm, and Xe being used as enclosed gas whose pressure is 55 Pa, electric charges are represented as Q=CV=it so that the charge time t is approximately 2 μsec, wherein electric charges, capacitance of the excimer discharge lamp, applied voltage and current are represented by Q, C, V, and i, respectively.

Thus, when light is modulated by changing lighting frequency of the rectangular wave voltage applied to the excimer discharge lamp, since the duty ratio per ½ cycle is constant, if the lighting frequency is changed, on-time per ½ cycle, that is, a period during which a switching FET gate of a full bridge circuit is open, also changes. For example, although when on-time and the off-time are 2 μsec and 8 μsec respectively, the on-time duty ratio is 20% and lighting frequency is 100 kHz, and the on-time and the off-time become 4 μsec and 16 μsec respectively when the lighting frequency is changed to 50 kHz.

An excimer discharge lamp in which light is modulated by burst dimming is disclosed in Japanese Laid Open Patent No. 10-97898. In the burst dimming, voltage which is generated by modulating high voltage with high frequency ranging from a few tens to hundreds of kHz by pulse voltage with low frequency lower than the high frequency is applied to the excimer discharge lamp wherein light is modulated by changing on/off ratio of this pulse voltage.

Incidentally, in the light modulating apparatus in which light is modulated by changing lighting voltage impressed to an excimer discharge lamp, although intensity of light emitted from the excimer discharge lamp can be strengthened by increasing the lighting voltage in order to increase lamp power, as the lighting voltage increases, the amount of excitation of energy levels which are different from energy level for emitting 172 nm light, that is, excimer light increases, thereby causing drop of luminous efficiency of the 172 nm light. In addition, when the lighting voltage is decreased, the lamp power becomes insufficient so that the lamp stops lighting.

Figure 10:
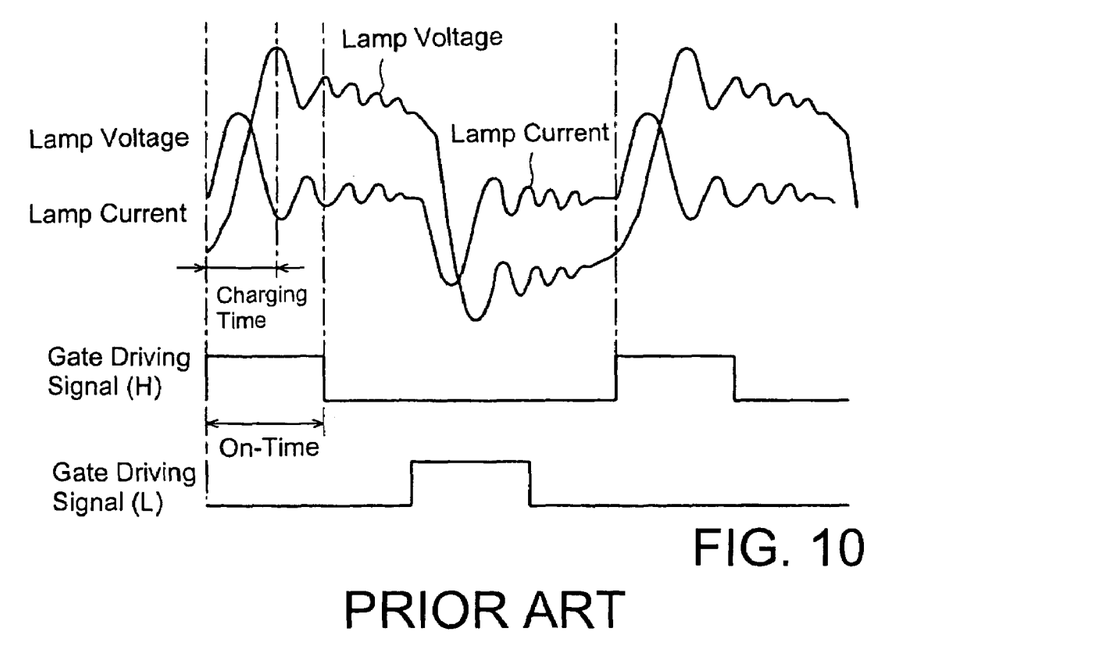
FIG. 10 is a diagram illustrating a lamp voltage waveform, lamp current waveform, and a gate signal waveform of a full bridge circuit in an excimer discharge lamp light modulating apparatus, wherein a conventional full bridge circuit is used.

FIG. 10 shows a waveform of lamp voltage, a waveform of lamp current and a waveform of a gate signal of a full bridge circuit in a light modulating apparatus wherein frequency of rectangular waveform voltage impressed to an excimer discharge lamp is changed so as to modulate light.

As shown in the FIG., when on-time is more than charging time per ½ cycle, that is, when the switching EFT gate of the full bridge circuit is open more than the charging time, as shown in the lamp current waveform, backward current flows due to oscillating current after charging is completed. That is, while the FET gate of the full bridge circuit is open after the charging is completed, since series resonance occurs by an inductance component of a transformer, a capacitance component of a load, and a resistance component of the load, unstable discharge which cannot be controlled in the excimer discharge lamp, is generated so that it is difficult to modulate light stably.

In addition, in case that light is modulated by changing lighting frequency, when the lighting frequency is changed, on-time also changes, and since magnetic flux density is represented by B=Vt/NS wherein voltage applied to the transformer, the number of turns of the coil, and the cross sectional area of transformer core are represented by V, N and S, and since time t increases depending on the on-time of switching FET, exciting current increases so that heat is generated in the transformer.

In the burst dimming, the range of light modulation is remarkably increased so that light modulation ranging approximately from 0% to 100% is possible, but complicated controlling circuits are necessary. In addition, since ons/offs of low frequency pulse voltage is repeated, overshooting of voltage which is applied to the excimer discharge lamp occurs every time the pulse voltage is turned on or off so that causing unstable or abnormal discharge. Further, even during on-time period, since light which is turned on by voltage with high frequency which is reference frequency is not stabilized due to fluctuation of the load of the excimer discharge lamp, it is difficult to modulate light stably as a whole.

The present invention will become more apparent from the following detailed description of the embodiments and examples of the present invention.

SUMMARY OF THE INVENTION

In view of the above problems, it is an object of the present invention to provide a light modulating apparatus for an excimer discharge lamp capable of stably modulating light of the excimer discharge lamp in a wide range, wherein voltage with high frequency higher than 1000 Hz band is applied to the excimer discharge lamp, and light is modulated by changing frequency of the high frequency voltage. The high frequency of the voltage is generally 1000 Hz or greater, and more preferably from a few tens kHz to hundreds of kHz.

The above object can be achieved by a light modulating apparatus for an excimer discharge lamp, wherein high frequency voltage whose frequency is 1000 Hz band or higher is applied to the excimer discharge lamp and light is modulated by changing the frequency of the high frequency voltage, wherein on-time per ½ cycle of the frequency is set so that the on-time is approximately equal to charging time for acquiring electric charges which contribute to light emission of the excimer discharge lamp.

The charging time may be set based on main discharge time of lamp current.

The charging time may be set based on a period in which lamp current flows more than a threshold level.

The high frequency voltage may be modulated by rectangular waveform voltage whose frequency is lower than the frequency of the high frequency voltage.

The high frequency voltage may be modulated by cut voltage which is generated by cutting sin wave voltage having low frequency which is lower than that of the high frequency voltage to a threshold value or less.

The high frequency voltage may be modulated by cut and offset voltage which is generated by offsetting sine wave voltage by a certain value and cutting the offset sine wave voltage to a threshold level or less.

In the light modulating apparatus, the intensity of light emitted from the excimer discharge lamp may be detected, and the frequency of the high frequency voltage is changed based on the light intensity.

Since in a light modulating apparatus for an excimer discharge lamp high frequency voltage whose frequency is 1000 Hz band or higher is applied to the excimer discharge lamp and light is modulated by changing the frequency of the high frequency voltage, wherein on-time per ½ cycle of the frequency is set so that the on-time is approximately equal to charging time for acquiring electric charges which contribute to light emission of the excimer discharge lamp, oscillating current does not flow after the charging is completed, so that the state of the off-time is controlled, and voltage in the excimer discharge lamp does not drop during the off-time. Further, as a result of frequency change for modulating light, even though the off-time changes, voltage applied to the excimer discharge lamp does not change so that stable light modulation is possible.

Further, if the charging time for acquiring electric charges which contribute to light emission of the excimer discharge lamp is set based on main discharge time of the lamp current, it is possible to appropriately set time for acquiring which contribute the light emission of the excimer discharge lamp.

Furthermore, if the charging time for acquiring charges which contribute to light emission of the excimer discharge lamp is set based on a period in which the lamp current flows more than a threshold level, it is possible to easily set time for acquiring electric charges which contribute to light emission of the excimer discharge lamp.

If the high frequency voltage applied to the excimer discharge lamp is modulated by rectangular waveform voltage which is capable of changing conduction time wherein the frequency of the rectangular voltage is lower than frequency of the high frequency waveform voltage, light may be modulated by changing not only frequency of the high frequency voltage but also conduction time of the rectangular waveform voltage so that it is possible to stably modulate light emitted from the excimer discharge lamp in a wide range.

Further, Sine the high frequency voltage applied to the excimer discharge lamp by cut voltage, wherein the peak (crest) value of the sine wave voltage is cut to a threshold level or less, it is possible to modulate light by changing not only the frequency of the high frequency voltage but also the frequency of the sine wave voltage whose peak value is cut so that it is possible to stably modulate light emitted from the excimer discharge light in a wide range.

Furthermore, the high frequency voltage applied to the excimer discharge lamp is modulated by the sine wave voltage wherein the sing wave voltage is offset by a certain threshold and the peak (crest) value of the sine wave voltage is cut at a threshold level or less, it is possible to modulate light by changing the frequency of the offset and cut sine wave voltage so that it is possible to stably modulate light emitted from the excimer discharge light in a wide rang In the light modulating apparatus, since the frequency of the high frequency voltage may be changed based on detected intensity of light emitted from the excimer discharge lamp, it is possible to modulate light according to the intensity of emitted light.

DESCRIPTION OF THE DRAWINGS

The present invention will now be described by way of example with reference to the following FIGS., in which.

DETAILED DESCRIPTION OF THE INVENTION

Description of a first embodiment according to the present invention will be given below, referring to FIGS. 1 to 3.

Figure 1:
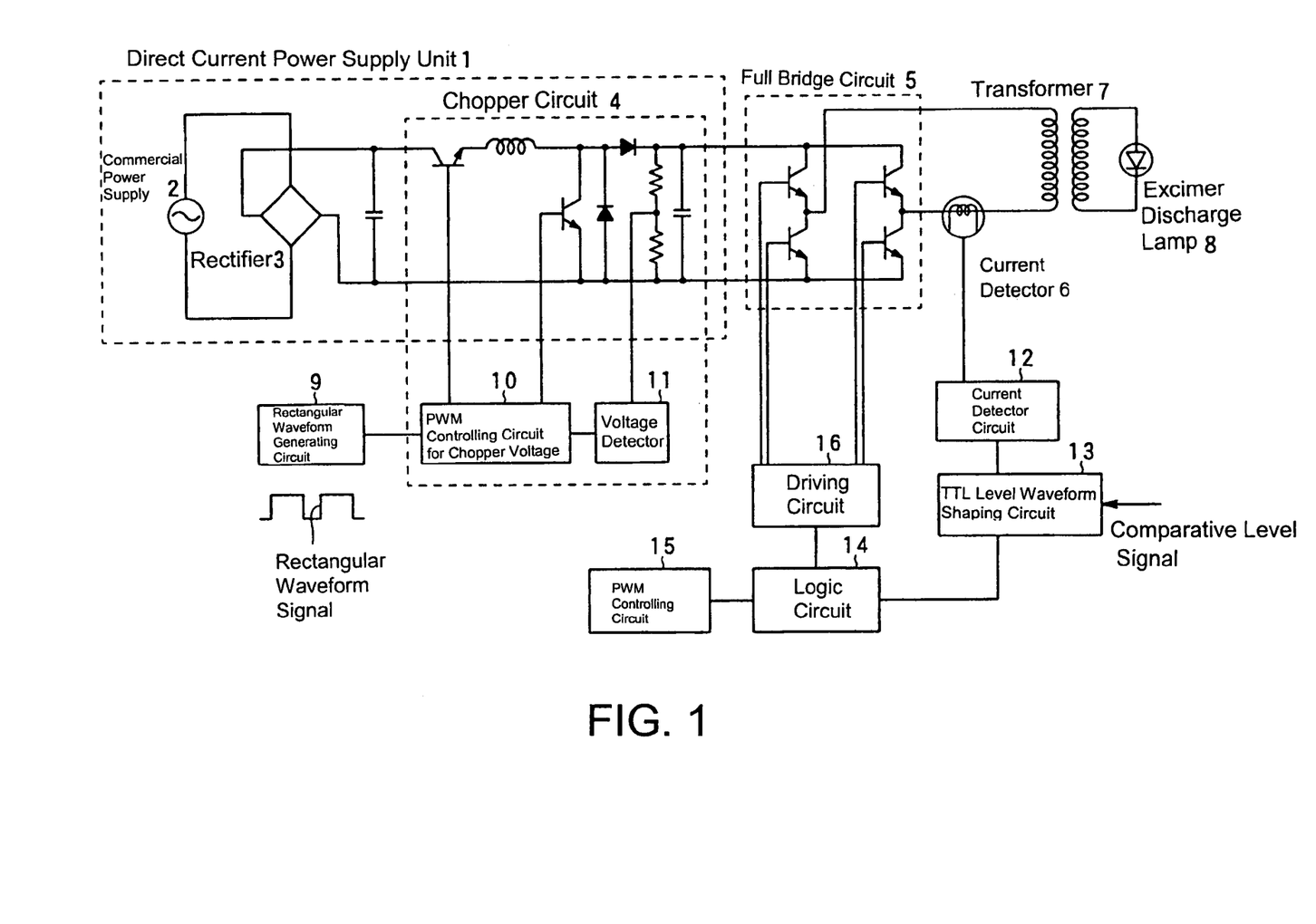
FIG. 1 is a block diagram illustrating the structure of an excimer discharge lamp light modulating apparatus according to a first embodiment of the present invention.

FIG. 1 shows the structure of a light modulating apparatus for an excimer discharge lamp according to this embodiment of the present invention. FIG. 2 is a timing chart illustrating a current waveform or a signal waveform of each part of the light modulating apparatus for the excimer discharge lamp shown in FIG. 1. In FIG. 3, a waveform shown in the top of the figure shows an output waveform outputted from a chopper circuit 4 shown in FIG. 1. In FIG. 3, the second waveform from the top shows an output voltage waveform outputted from a full bridge circuit 5 shown in FIG. 1.

In FIG. 1, the light modulating apparatus for an excimer discharge lamp comprises a direct current power supply unit 1, a commercial power supply 2, a rectifier 3, a chopper circuit 4, a full bridge circuit 5, a current detector 6 for detecting lamp current, a transformer 7, an excimer discharge lamp 8, a rectangular waveform generating circuit 9 for generating a rectangular wave form signal, a PWM controlling circuit 10 for chopper voltage, which sends switching elements turning on/off signal for the chopper circuit 4 based on the rectangular waveform signal outputted from the rectangular waveform generating circuit 9, a voltage detector 11, a current detecting circuit 12 for rectified lamp current detected by the current detector 6, a TTL level waveform shaping circuit 13 for converting a current signal into a shaping pulse signal by, in a built-in comparator, comparing the rectified lamp current inputted from the current detecting circuit 12 with a comparative level signal which is a threshold value, a logic circuit 14, a PWM controlling circuit 15 for outputting a PWM pulse signal for controlling each switching element of the full bridge circuit 5, and a driving circuit 16.

Figure 2:
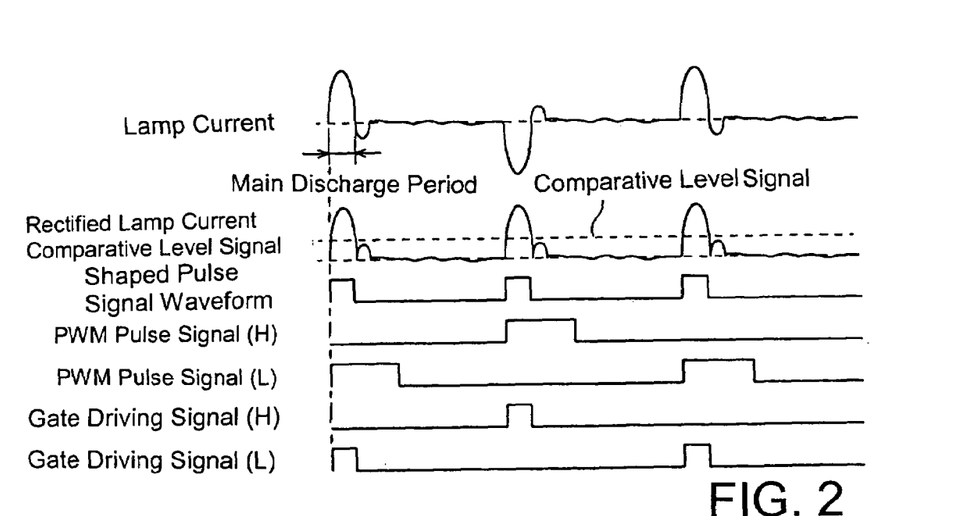
FIG. 2 is a timing chart of current or a signal waveform in each part of the excimer discharge lamp light modulating apparatus shown in FIG. 1.

FIG. 2 shows a lamp current waveform detected by the current detector 6 (the first waveform from the top in the figure, a rectified lamp current waveform which is generated by rectifying the lamp current inputted from the current detecting circuit 12 and the comparative level signal (the second waveform from the top in the figure, a shaped pulse signal waveform which is outputted to the logic circuit 14 from the TTL level waveform shaping circuit 13 during a period corresponding to the lamp current period and is equal to or larger than the comparative level signal (the third waveform from the top in the figure, a PWM pulse signal (H side) inputted to the logic circuit 14 from the PWM controlling circuit 15 (the fourth waveform from the top in the figure, a PWM pulse signal (L side) inputted to the logic circuit 14 from the PWM controlling circuit 15 (the fifth waveform from the top in the figure, a gate driving signal (H side) which is obtained by a logical operation of the shaped signal and the PWM pulse signal in the logic circuit 14 and is outputted to each switching element of the full bridge circuit 5 from the driving circuit 16 (the sixth waveform from the top in the figure, and a gate driving signal (L side) which is obtained by a logical operation of the shaping pulse signal and the PWM pulse signal in the logic circuit 14 and is outputted to each switching element of the full bridge circuit 5 from the driving circuit 16 (the last waveform in the figure.

For example, duty ratio and frequency of the PWM pulse signal outputted from the PWM controlling circuit 15, is 40% and 100 kHz, respectively, and light of the excimer discharge lamp 8 can be modulated by changing the frequency.

As in the sixth and seventh wave form in FIG. 2, the switching elements of the full bridge circuit 5 is turned off by the gate driving signal (the second waveform from the top in FIG. 2) except for a lamp current period when the main discharge which contributes to light emission of the excimer discharge lamp 8 is carried out. That is, the switching elements of the full bridge circuit 5 is turned on by the gate driving signal only during the period when the main discharge which contributes to light emission of the excimer discharge lamp is carried out.

As a result, on-time per ½ cycle of the high frequency voltage applied to the excimer discharge lamp 8 is set so that the on-time is approximately equal to time for acquiring electric charges which contribute to light emission of the excimer discharge lamp 8, and the gates of the switching elements of the full bridge circuit 5 are closed, at the same time when the charging is completed.

Figure 9:
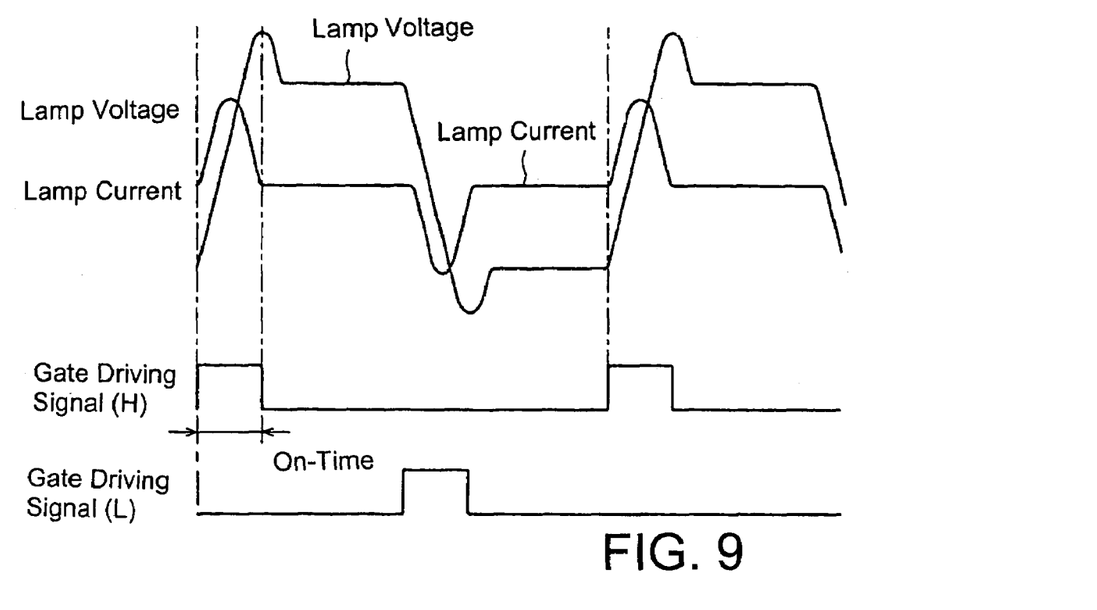
FIG. 9 is a diagram illustrating a lamp voltage waveform, a lamp current waveform, and a gate signal waveform of a full bridge circuit in the excimer discharge lamp of the light modulating apparatus.

Thus, according to the embodiment of the present invention, since current commutation flowing through the excimer discharge lamp 8 is detected and charging time is fed back so that charging time and on-time per ½ cycle of the rectangular waveform voltage certainly correspond to each other, when the switching element of the full bridge circuit 5 is turned off, as shown in FIG. 9, the lamp current does not become oscillating current after the charging is completed, and the lamp voltage value is also kept constant.

That is, the oscillating lamp current does not flow after the charging is completed as shown in FIG. 10 so that the off-period is controlled. Thereby, since voltage of the excimer discharge lamp does not drop during the off-period and the voltage applied to the excimer discharge lamp 8 does not change even though the off period is changed due to change of frequency for light modulation, it is possible to stably modulate light.

In addition, since the on-time of the switching element and charging time for acquiring electric charges which contribute to the light emission correspond to each other, that is, the on-time is approximately equal to the charging time, even though the frequency is changed, the on-time does not change, and further, since magnetic flux density B does not change wherein B equals to Vt/NS (B=Vt/NS), exciting current does not flow so that it is possible to control generation of heat in the transformer.

Figure 3:
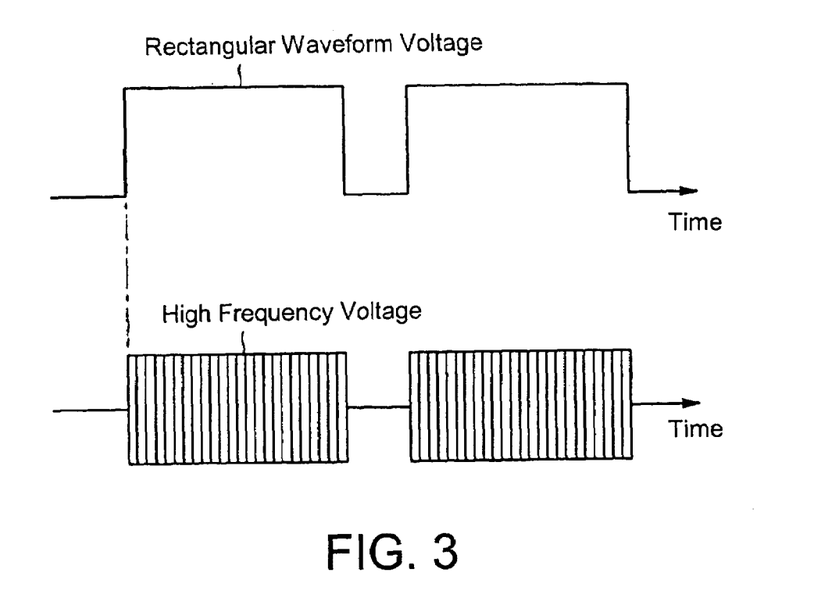
FIG. 3 is a diagram illustrating an output voltage waveform of a chopper circuit 4 of the excimer discharge lamp light modulating apparatus shown in FIG. 1 (the first waveform from the top in the figure and an output voltage waveform of a full bridge circuit 5 of the light modulating apparatus (the second waveform from the top in the figure.

Further, according to the embodiment of the present invention, since based on the rectangular waveform signal generated by the rectangular waveform generating circuit 9, the chopper circuit 4 is controlled by a signal outputted from the PWM controlling circuit 10 for chopper voltage, the chopper circuit 4 outputs rectangular waveform voltage as shown-in FIG. 3 (the waveform shown in the top of the figure.

Therefore, in the full bridge circuit 5, the switching element of the full bridge circuit 5 are driven during time when the rectangular waveform voltage is inputted and high frequency voltage modulated by rectangular waveform voltage as shown in the bottom of FIG. 3 can be outputted from the full bridge circuit 5.

As a result, as described above, not only is light modulated by changing frequency of a gate drive signal which is sent to the switching elements of the full bridge circuit 5, but, at the same time, light is also modulated by changing conduction time or the magnitude of rectangular waveform voltage outputted from the chopper circuit 4.

As a result, it is possible to modulate light in these two ways at the same time so that it is possible to stably modulate light emitted from the excimer discharge lamp in a wide range.

A second embodiment of the present invention will be described below, referring to FIGS. 4 and 5.

Figure 4:
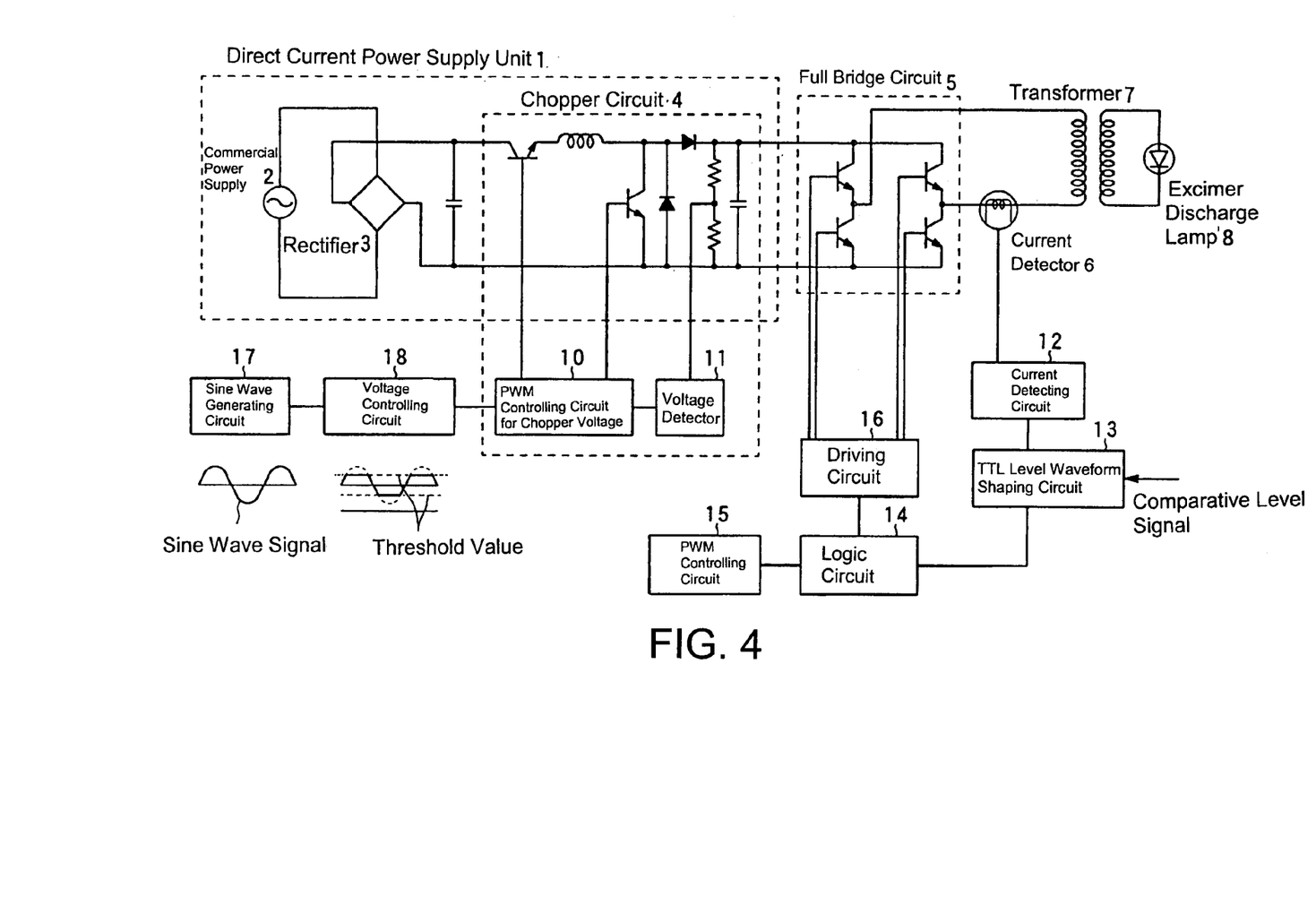
FIG. 4 is a block diagram illustrating an excimer discharge lamp light modulating apparatus according to a second embodiment of the present invention.

FIG. 4 shows the structure of an excimer discharge lamp light modulating apparatus. In FIG. 5, the first waveform from the top shows an output voltage waveform of a chopper circuit 4 and the second waveform from the top shows an output voltage waveform of a full bridge circuit 5.

In FIG. 4, the excimer discharge lamp light modulating apparatus comprises a sine wave generating circuit 17, a voltage controlling circuit for outputting a signal which is generated by cutting the positive side and negative side of a sine wave signal inputted from the sine waveform generating circuit 17 by a threshold value(s) signal. In addition, in FIG. 4, the same reference numbers as those in FIG. 1 are assigned to the same structure elements as those in FIG. 1 and the description of these structure elements is omitted.

According to the embodiment of the present invention, since the sine waveform signal outputted from the sine wave generating circuit 17 is cut by a certain threshold value in the voltage controlling circuit 18, the cut sine waveform signal is outputted to the chopper circuit 4 from the PWM controlling circuit 10 for chopper voltage.

Figure 5:
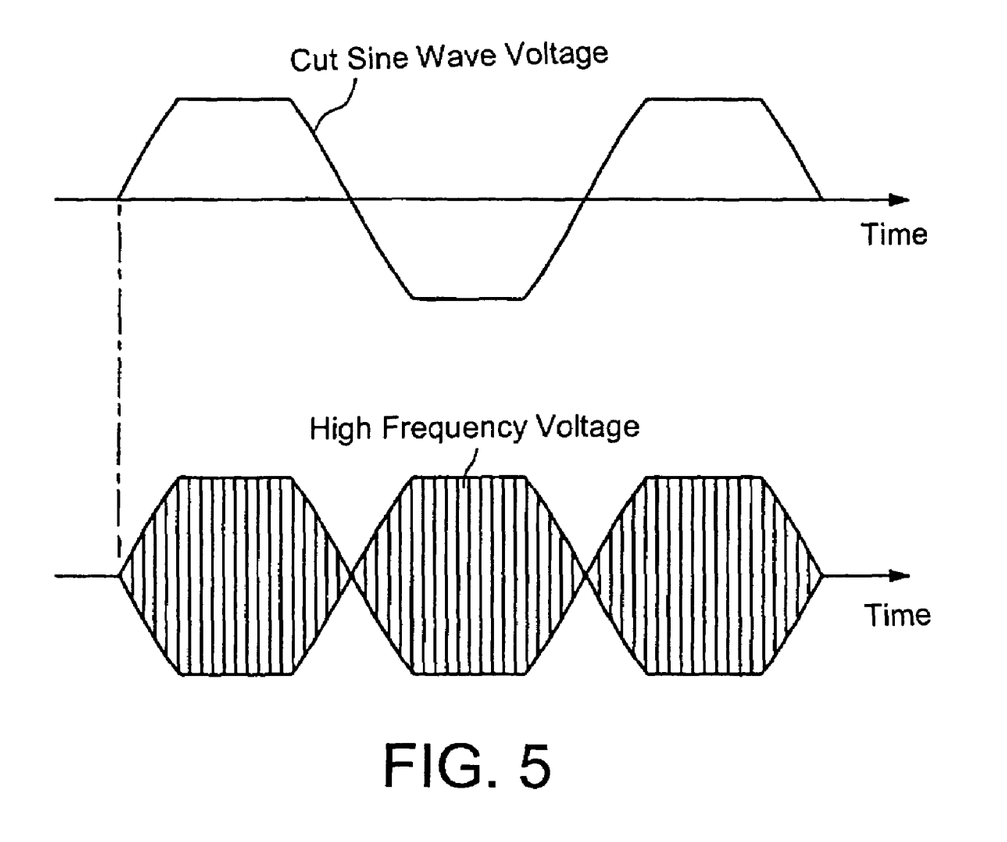
FIG. 5 is a diagram illustrating an output voltage waveform of a chopper circuit 4 of the excimer discharge lamp light modulating apparatus shown in FIG. 4 (the first waveform from the top in the figure and an output voltage waveform of a full bridge circuit 5 of the light modulating apparatus (the second waveform from the top of the figure.

As a result, the cut sine waveform voltage shown in FIG. 5 (the first waveform from the top) is outputted from the chopper circuit 4.

Since when the cut voltage is inputted to the full bridge circuit 5, the switching elements of the full bridge circuit 5 are driven during the time when the cut voltage is inputted, the high frequency voltage modulated by the cut voltage shown in FIG. 5 (the second waveform in the figure is outputted from the full bridge circuit 5.

As a result, as described as to the excimer discharge lamp in the first embodiment, not only is light modulated by changing frequency of a gate driving signal which is outputted from the driving circuit 16 and is sent to the switching elements of the full bridge circuit 5, but, at the same time, light is also modulated by changing the frequency of the cut voltage outputted from the chopper circuit 4. Therefore, it is possible to modulate light in the combination of these two ways at the same time so that it is possible to stably modulate light emitted from the excimer discharge lamp in a wide range.

A third embodiment according to the present invention will be described, referring to FIGS. 6 and 7.

Figure 6:
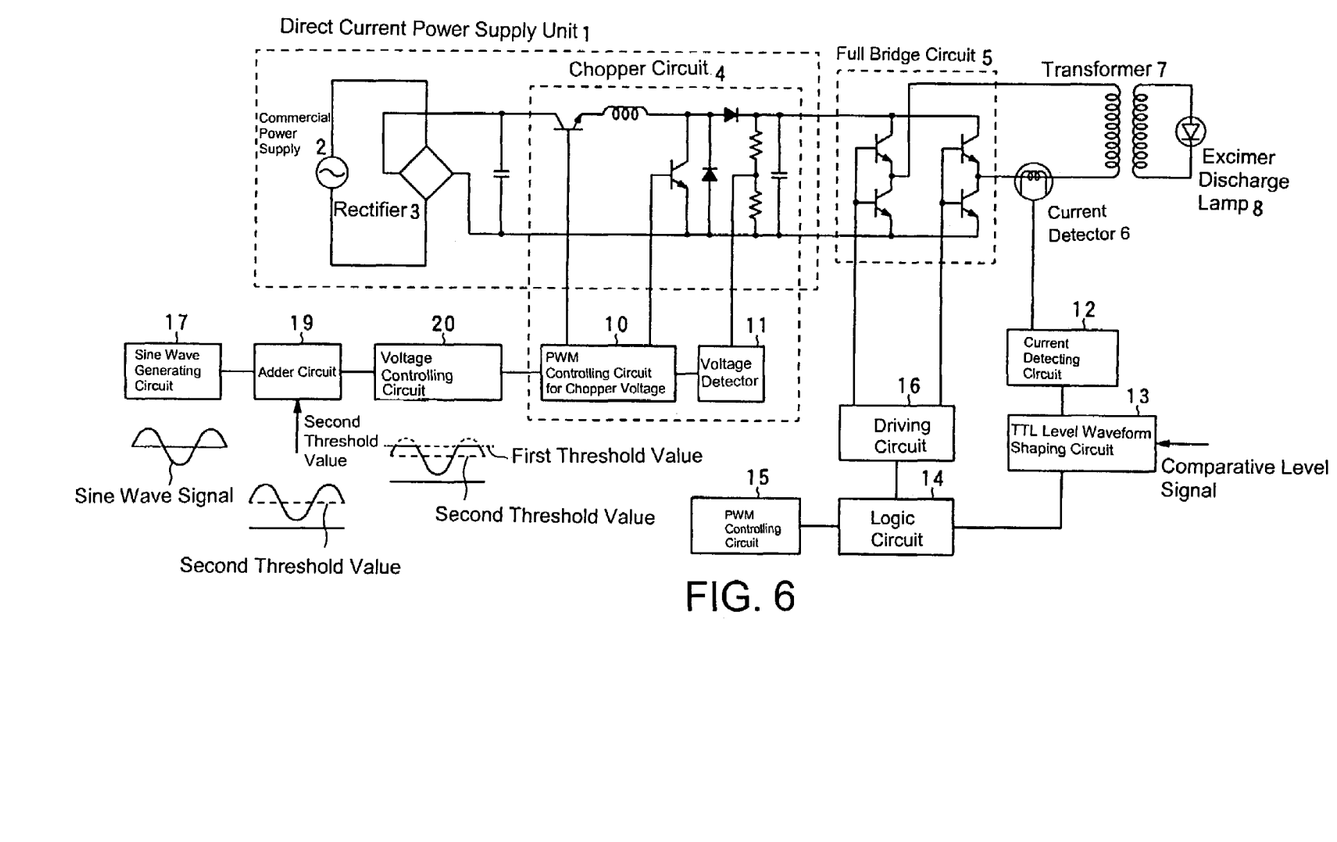
FIG. 6 is a block diagram illustrating the structure of the excimer discharge lamp light modulating apparatus according to a third embodiment of the present invention.

FIG. 6 shows the structure of an excimer discharge lamp light modulating apparatus according to the embodiment. In FIG. 7, the first waveform from the top shows an output voltage waveform of a chopper circuit 4, and the second waveform from the top shows an output voltage waveform of a full bridge circuit 5.

In FIG. 6, an adder circuit 19 offsets a sine wave signal inputted from a sine wave generating circuit 17 by a certain value (the second threshold value), and a voltage control circuit 20 outputs a signal which is obtained by cutting the offset signal inputted from the adder circuit 19 by a signal having a certain value (the first threshold value).

The other structures shown in the FIG. approximately correspond to those shown in FIGS. 1–4, and the same numerals are assigned thereto so that description thereof is omitted.

According to the embodiment, the sine waveform signal outputted from the sine wave generating circuit 17 is offset by the certain value (the second threshold) in the adder circuit 19. That is, a direct current signal is superposed on the sine wave signal.

Next, the offset signal outputted from the adder circuit 19 is cut by the certain value (the first threshold) in the voltage control circuit 20.

Therefore, from a PWM control circuit 10 for chopper voltage, the offset and cut signal is outputted to the chopper circuit 4.

Figure 7:
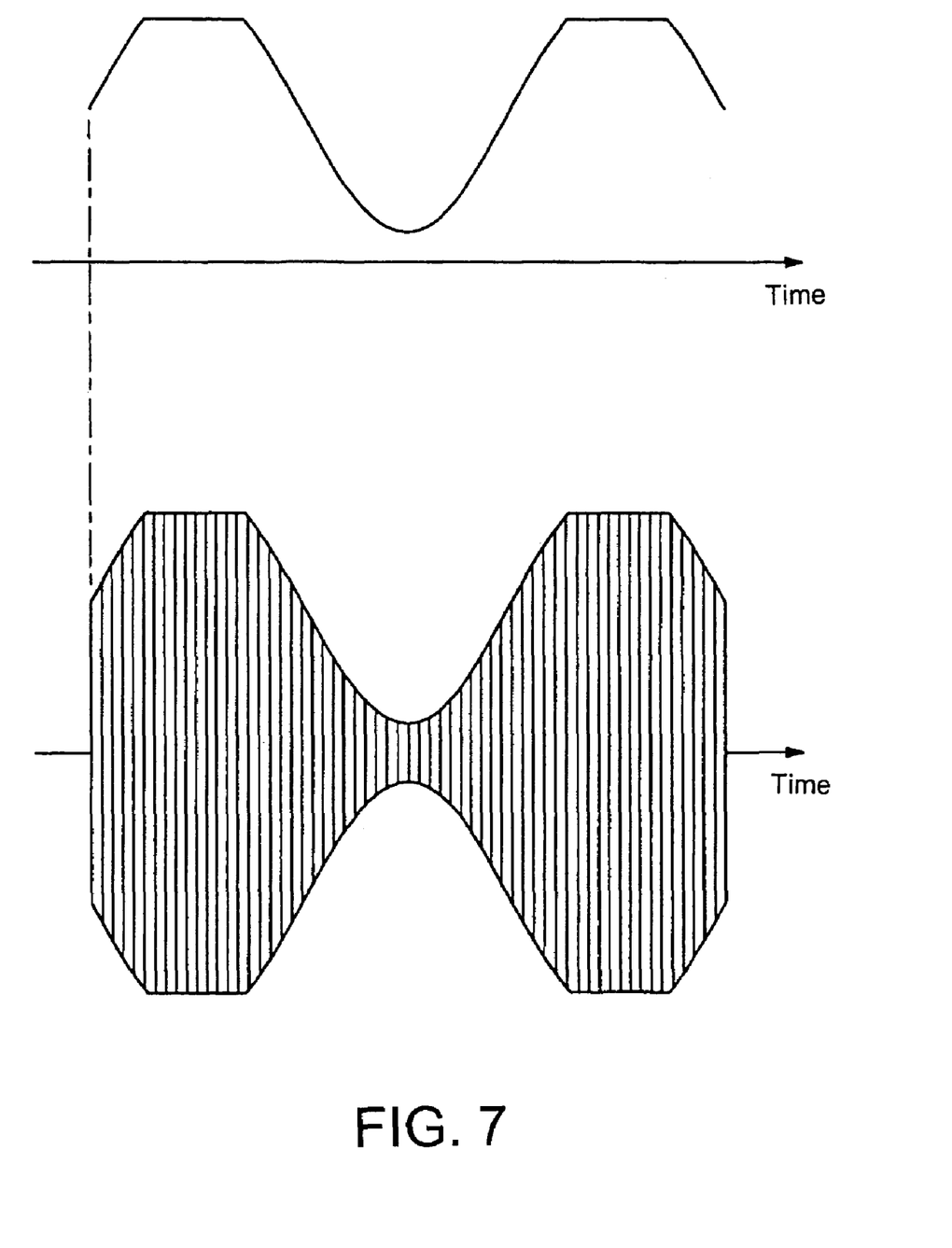
FIG. 7 is a diagram illustrating an output voltage waveform of a chopper circuit 4 of the excimer discharge lamp light modulating apparatus shown in FIG. 6 (the first waveform from the top in the figure and an output voltage waveform of a full bridge circuit 5 of the light modulating apparatus (the second waveform from the top in the figure.

As a result, the chopper circuit 4 outputs the offset and cut sine wave voltage as the first waveform from the top in FIG. 7.

Since the offset and cut voltage is inputted to the full bridge circuit 5, and the switching element of the full bridge circuit 5 is driven while the offset and cut voltage is inputted, the full bridge 5 outputs high frequency voltage which is modulated by the offset and cut voltage as shown as the second waveform from the top in FIG. 7.

As a result, as well as the excimer discharge lamp light modulating apparatus described in the first embodiment, while light is modulated by changing frequency of a gate drive signal which is sent to the switching elements of the full bridge circuit 5 from the drive circuit 16, light can be modulated by changing frequency of the offset and cut voltage outputted from the chopper circuit 4. Thus, since light can be modulated by the combination of these two ways, it is possible to stably modulate light outputted from an excimer discharge lamp in a wide range.

A fourth embodiment according to the present invention will be described, referring to FIG. 8.

Figure 8:
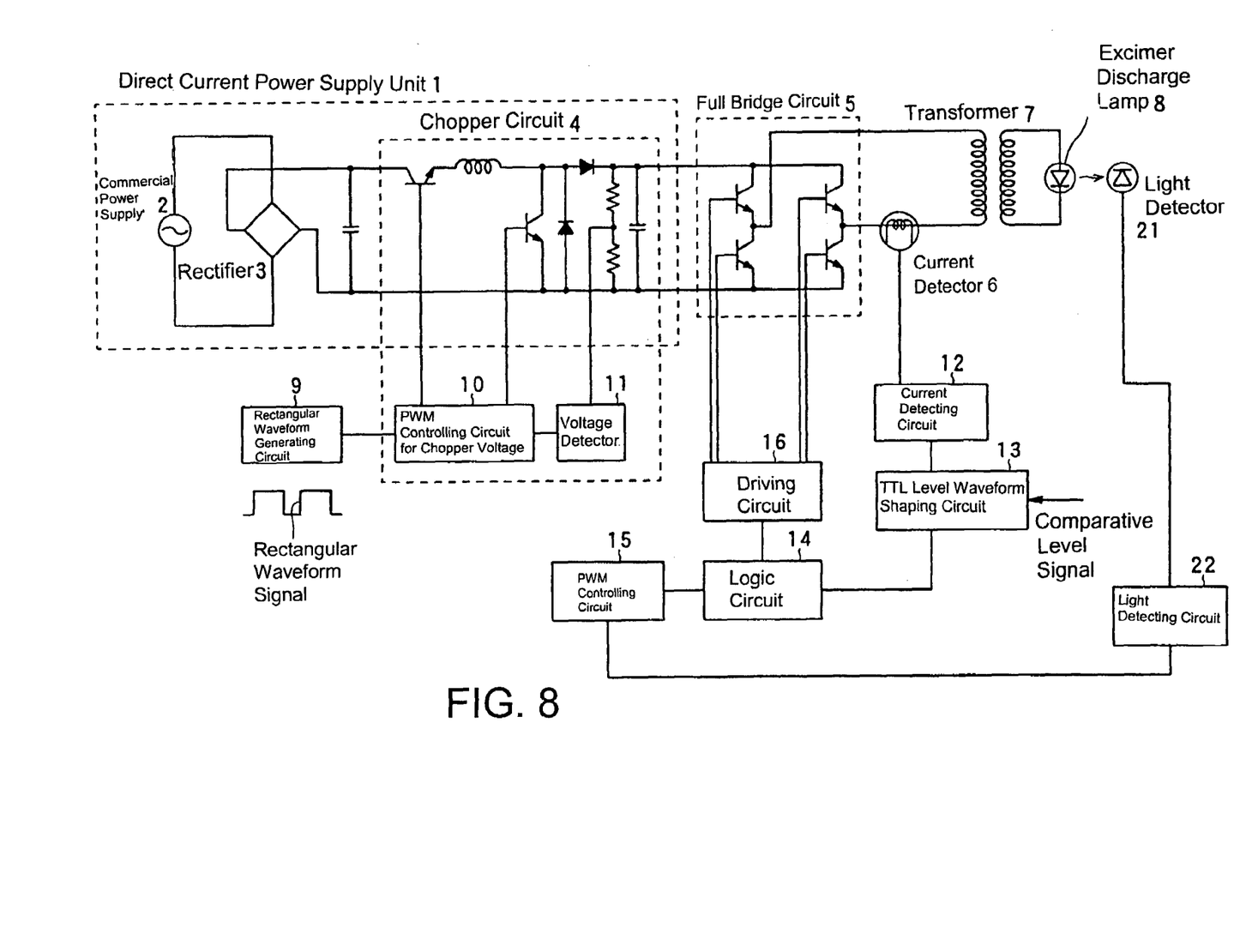
FIG. 8 is a block diagram illustrating the structure of an excimer discharge lamp light modulating apparatus according to a forth embodiment of the present invention.

FIG. 8 shows the structure of an excimer discharge lamp light modulating apparatus according to the embodiment of the present invention.

In FIG. 8, a light detector 21 detects the light intensity of radiation from the excimer discharge lamp 8, and a light detecting circuit 22 rectifies light current detected by the light detector 21.

The other structures shown in the figure. approximately correspond to those shown in FIG. 1, and the same numerals are assigned thereto so that description thereof is omitted.

According to the embodiment of the present invention, in addition to the first embodiments, it is possible to modulate light by changing frequency of the gate drive signal sent from the switching element of the full bridge circuit 5, based on the light intensity of radiation from the excimer discharge lamp 8.

Thus the present invention possesses a number of advantages or purposes, and there is no requirement that every claim directed to that invention be limited to encompass all of them.

The disclosure of Japanese Patent Application No. 2003-307626 filed on Aug. 29, 2003 including specification, drawings and claims is incorporated herein by reference in its entirety.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A light modulating apparatus for an excimer discharge lamp, wherein high frequency voltage whose frequency is 1000 Hz band or higher is applied to the excimer discharge lamp and light is modulated by changing the frequency of the high frequency voltage, wherein on-time per ½ cycle of the frequency is set so that the on-time is approximately equal to charging time for acquiring electric charges which contribute to light emission of the excimer discharge lamp.

2. The light modulating apparatus according to claim 1, wherein the charging time is set based on main discharge time of lamp current.

3. The light modulating apparatus according to claim 1, wherein the charging time is set based on a period in which lamp current flows more than a threshold level.

4. The light modulating apparatus according to claim 1, wherein, the high frequency voltage is modulated by rectangular waveform voltage whose frequency is lower than the frequency of the high frequency voltage.

5. The light modulating apparatus according to claim 1, wherein the high frequency voltage is modulated by cut voltage which is generated by cutting sine wave voltage having low frequency which is lower than that of the high frequency voltage to a threshold value or less.

6. The light modulating apparatus according to claim 1, wherein the high frequency voltage is modulated by cut and offset voltage which is generated by offsetting sine wave voltage by a certain value and cutting the offset sine wave voltage to a threshold level or less.

7. The light modulating apparatus according to claim 1, wherein intensity of light emitted from the excimer discharge lamp is detected, and the frequency of the high frequency voltage is changed based on the light intensity.

* * * * *